US012589633B2

(12) United States Patent
Boger et al.

(10) Patent No.: US 12,589,633 B2
(45) Date of Patent: Mar. 31, 2026

---

(54) AIR-CONDITIONING SYSTEM FOR MOTOR VEHICLE

(71) Applicant: MAHLE International GmbH, Stuttgart (DE)

(72) Inventors: Markus Boger, Stuttgart (DE); Matthias Jung, Stuttgart (DE)

(73) Assignee: Mahle International GmbH (DE)

( * ) Notice: Subject to any disclaimer, the term of this patent is extended or adjusted under 35 U.S.C. 154(b) by 280 days.

(21) Appl. No.: 18/101,113

(22) Filed: Jan. 24, 2023

(65) Prior Publication Data

US 2023/0234424 A1 Jul. 27, 2023

(30) Foreign Application Priority Data

Jan. 25, 2022 (DE) ..................... 10 2022 200 777.8
Dec. 20, 2022 (DE) ..................... 10 2022 214 069.9

(51) Int. Cl.
*B60H 1/32* (2006.01)
*B60H 1/00* (2006.01)
*B60H 1/14* (2006.01)

(52) U.S. Cl.
CPC ....... *B60H 1/3228* (2019.05); *B60H 1/00278* (2013.01); *B60H 1/143* (2013.01)

(58) Field of Classification Search
CPC ... B60H 1/3228; B60H 1/00278; B60H 1/143
See application file for complete search history.

(56) References Cited

U.S. PATENT DOCUMENTS

| | | |
|---|---|---|
| 11,446,978 B2 | 9/2022 | Bara |
| 2016/0107507 A1 | 4/2016 | Johnston |

(Continued)

FOREIGN PATENT DOCUMENTS

| | | |
|---|---|---|
| CN | 112810402 A | 5/2021 |
| DE | 102020100428 A1 | 8/2020 |
| EP | 1472106 A1 | 11/2004 |

(Continued)

OTHER PUBLICATIONS

German Search Report dated Jul. 8, 2023 for German Patent Application No. 10 2022 214 069.9.

(Continued)

*Primary Examiner* — Elizabeth J Martin
(74) *Attorney, Agent, or Firm* — Fishman Stewart PLLC

(57) ABSTRACT

An air-conditioning system for a motor vehicle is disclosed. The air-conditioning system includes a refrigerant circuit for being flowed through by a refrigerant. In the refrigerant circuit, a compressor for compressing the refrigerant, a condenser for condensing the refrigerant subject to passing condensation heat on to a fluid conducted through the condenser, an expansion device for expanding the refrigerant and an evaporator for evaporating the refrigerant are arranged. A coolant circuit is provided fluidically separated from the refrigerant circuit for being flowed through by a coolant. In the coolant circuit at least one heat source for heating the coolant is arranged. The coolant circuit is thermally connected to the refrigerant circuit via the evaporator of the refrigerant circuit, so that in the evaporator heat from the coolant is transferrable to the refrigerant.

20 Claims, 3 Drawing Sheets

(56)     References Cited

U.S. PATENT DOCUMENTS

2020/0247212  A1 *   8/2020  Bara  ........................ B60H 1/10
2021/0283984  A1 *   9/2021  Miyoshi  .............. B60H 1/3227

FOREIGN PATENT DOCUMENTS

WO          2020242096  A1    12/2020
WO          2021054043  A1     3/2021

OTHER PUBLICATIONS

Chinese First Office Action dated Jan. 27, 2026 and Chinese Search
Report dated Jan. 23, 2026 for Chinese Patent Application No.
2023100978742.

* cited by examiner

AIR-CONDITIONING SYSTEM FOR MOTOR VEHICLE

CROSS-REFERENCE TO RELATED APPLICATIONS

This application claims priority to German Application No. 10 2022 200 777.8 filed Jan. 25, 2022 and German Application No. 10 2022 214 069.9 filed Dec. 20, 2022, the contents of each of which are here by incorporated by reference in their entirety.

TECHNICAL FIELD

The invention relates to an air-conditioning system for a motor vehicle and to a motor vehicle having such an air-conditioning system.

BACKGROUND

For the energy-efficient heating of vehicle interiors of electric vehicles air-conditioning systems which are equipped with a heat pump are frequently employed. These heat pumps utilise as heat source waste heat present in the vehicle or the external environment of the vehicle. However, since the required quantity of heat cannot always be provided by means of these heat sources, such conventional systems are often equipped with an additional electric heating device for generating additional heat. However, providing such an additional heating device often involves considerable additional costs.

It is therefore an object of the present invention to create an improved embodiment for an air-conditioning system which takes into account the problems mentioned above. In particular, an improved air-conditioning system is to be created which, with low manufacturing costs, is characterised by an efficient provision of additional heat for heating a vehicle interior.

This object is solved through the subject of the independent patent claim(s). Preferred embodiments are subject of the dependent patent claims.

SUMMARY

Accordingly, the basic idea of the invention is to equip an air-conditioning system, in addition to an already existing refrigerant circuit functioning as heat pump, with a coolant circuit, which is thermally coupled to the refrigerant circuit. In this way, a coolant circulating in the coolant circuit can be heated and the heat introduced at lower temperature transferred with the help of a heat exchanger to the refrigerant circulating in the refrigerant circuit. The heat transferred to the refrigerant can be transferred in the refrigerant circuit to another fluid, in particular to a gas such as air, by means of which in turn the heating of the vehicle interior of a motor vehicle can then take place. Providing an additional electric heating device mentioned at the outset in the refrigerant circuit for heating the refrigerant is therefore not required with the solution introduced here. Merely a sufficiently efficient heat source has to be arranged in the coolant circuit which can be utilised for heating the coolant.

In detail, an air-conditioning system according to the invention includes a refrigerant circuit for being flowed through by a refrigerant. As refrigerant a fluid can be used for example which during the operation can be present both in the liquid and also in the gaseous phase. Possible refrigerants are in particular such as are known to the person skilled in the art by the designation "R-134a" or "R-1234yf".

However, using a refrigerant that is predominantly present in the gaseous state known to the person skilled in the art for example by the designation "R744" is also possible.

In a further alternative, carbon dioxide ($CO_2$) can also be used as refrigerant.

In the refrigerant circuit, a compressor for compressing the refrigerant, a condenser for condensing the refrigerant subject to passing condensation heat on to a fluid conducted through the condenser, an expansion device for expanding the refrigerant and an evaporator for evaporating the refrigerant are arranged.

On the one hand "condenser" here is to mean heat exchangers, which condense a gaseous refrigerant into the liquid state. On the other hand, heat exchangers are also included in which a gaseous refrigerant passes on heat without phase transition—in particular without condensation of the gaseous refrigerant—so that it is cooled. The designation "condenser" used here thus expressly includes embodiments in which in the condenser a gaseous refrigerant is cooled without this necessarily having to be accompanied by a phase transition from the gas phase into the liquid phase, i.e. a condensation of the refrigerant.

Here, "evaporator" is to mean a heat exchanger which supplies heat to a refrigerant in the gaseous or liquid phase so that the refrigerant is heated. In the process, a refrigerant present in the liquid phase can be evaporated. The designation "evaporator" used here thus expressly includes embodiments in which in the evaporator a refrigerant is heated, which is already present in the gaseous phase, so that in the evaporator, the heating of the refrigerant can no longer be accompanied by an evaporation of the same.

Further, the air-conditioning system comprises a coolant circuit formed fluidically separated from the refrigerant circuit for being flowed through by a coolant. According to the invention, at least one heat source for heating the coolant is arranged in the coolant circuit. According to the invention, the coolant circuit is thermally connected to the refrigerant circuit via the evaporator of the same, so that heat acting as evaporation heat in the evaporator can be transferred from the coolant to the refrigerant in order to heat and—in the case that it is present in the liquid phase—to evaporate the latter.

The air-conditioning system according to the invention proves to be particularly effective for the efficient heating of the vehicle interior of a motor vehicle when the motor vehicle equipped with the air-conditioning system according to the invention has been parked off over an extended period of time at ambient temperature and, following start-up of the motor vehicle, the heating-up of the vehicle interior is to take place as rapidly as possible with the help of the air-conditioning system.

According to a preferred embodiment, the at least one heat source arranged in the coolant circuit is an electric heating device. This allows utilising the said heating device—also known to the person skilled in the art as "electric additional heater"—even at low temperatures for providing heat for the refrigerant circuit. The temperature of the coolant is preferably raised with the help of the electric heating device to a temperature level that is higher than the level of the ambient temperature of the air-conditioning system. In order to avoid in this case heat losses by passing on heat to the external environment, the coolant circuit can also be provided with a thermal insulation. In this way, the heating-up behaviour of the coolant and thus also the efficiency in providing heat for the refrigerant circuit can also be improved.

According to another preferred embodiment, the at least one heat source arranged in the coolant circuit is an electric energy store, in particular an electric battery, the waste heat of which generated during the operation can be transferred to the coolant. In this way, the waste heat generated by the electric energy store or the battery during the operation can be utilised in an energy-efficient manner in order to supply heat to the coolant or refrigerant circuit functioning as heat pump. Practically, this electric energy store or this battery can be installed as standard in the motor vehicle equipped with the air-conditioning system according to the invention. The said electric energy store or the said battery can, in this case, be provided for example for supplying the electric drive train of the motor vehicle—in particular when the same is an electric vehicle with a purely battery-electric drive or a hybrid vehicle with internal combustion engine and electric drive train.

According to a further preferred embodiment, the at least one heat source arranged in the coolant circuit can therefore be an electric drive train, in particular an electric motor the waste heat of which generated during the operation can be transferred to the coolant. Particularly preferably, this can be an electric drive train of a motor vehicle using the air-conditioning system according to the invention, in particular an electric vehicle with purely electric drive train or a hybrid vehicle with internal combustion engine and with electric drive train.

According to an advantageous further development, a first and a second heat source, fluidically connected in series, are arranged in the coolant circuit. In this way, even two different heat sources can be utilised in order to make heat available. Preferentially, the first heat source is the electric heating device mentioned above and the second heat source is the electric energy store mentioned above, in particular the electric battery.

Particularly practically, the coolant circuit can include a bypass line by means of which the coolant can be conducted past the second heat source. In this way it can be achieved that the quantity of heat made available by the second heat source is supplied to the coolant only when required and transferred to the refrigerant by the same.

According to an advantageous further development, the coolant circuit comprises a valve device. By way of the valve device the portion of the coolant that is conducted through the bypass line past the second heat source can be adjusted. The said bypass can be realised in a technically particularly simple and thus cost-effective manner with the help of a valve device configured as a three-way valve, which is equipped with an input connection and two output connections or alternatively to this with one output connection and two input connections. In this case, for example the input connection communicates fluidically with the evaporator, whereas one of the two output connections fluidically communicates with a first fluid branch, in which the second heat source is arranged and the other one of the two output connections fluidically communicates with a second fluid branch, which forms the bypass line.

According to another advantageous further development of the invention, two or more heat sources can be arranged in the coolant circuit fluidically in parallel by means of a fluidic parallel connection.

According to an advantageous further development, the condenser is a two-stream heat exchanger, which can be flowed through both by the refrigerant and also—fluidically separated from the refrigerant, by the fluid or gas to be heated. In this way, heat from the refrigerant can be transferred to the fluid or gas—typically air—to be heated for temperature-controlling or heating the vehicle interior of a motor vehicle, with low installation space requirement.

According to a further advantageous further development, a collection reservoir for buffer-storing refrigerant can be arranged in the refrigerant circuit.

The invention, further, relates to a motor vehicle, in particular to an electric vehicle having a battery-electric drive. The motor vehicle according to the invention includes an air-conditioning system according to the invention introduced above for air-conditioning the vehicle interior. The advantages of the air-conditioning system according to the invention explained above therefore apply also to the motor vehicle according to the invention. Further, the motor vehicle according to the invention includes an electric drive train for driving the motor vehicle. Furthermore, the motor vehicle includes a vehicle coolant circuit for cooling the electric drive train. According to the invention, the coolant circuit of the air-conditioning system is at least partially formed by the vehicle coolant circuit. Because of this, the provision of a separate coolant circuit for the air-conditioning system can be omitted, which is accompanied by cost advantages in the manufacture of the motor vehicle.

According to an advantageous further development of the motor vehicle according to the invention, a coolant radiator for transferring heat from the coolant to a gas conducted through the coolant radiator is arranged in the vehicle coolant circuit. In this way, heat from the heat source in the form of the electric drive train absorbed by the coolant can be directly passed on to the fluid or gas and in this way transferred to the environment.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference numbers relate to same of similar or functionally same components.

BRIEF DESCRIPTION OF THE DRAWINGS

It shows, in each case schematically.

DETAILED DESCRIPTION

Figure 1:
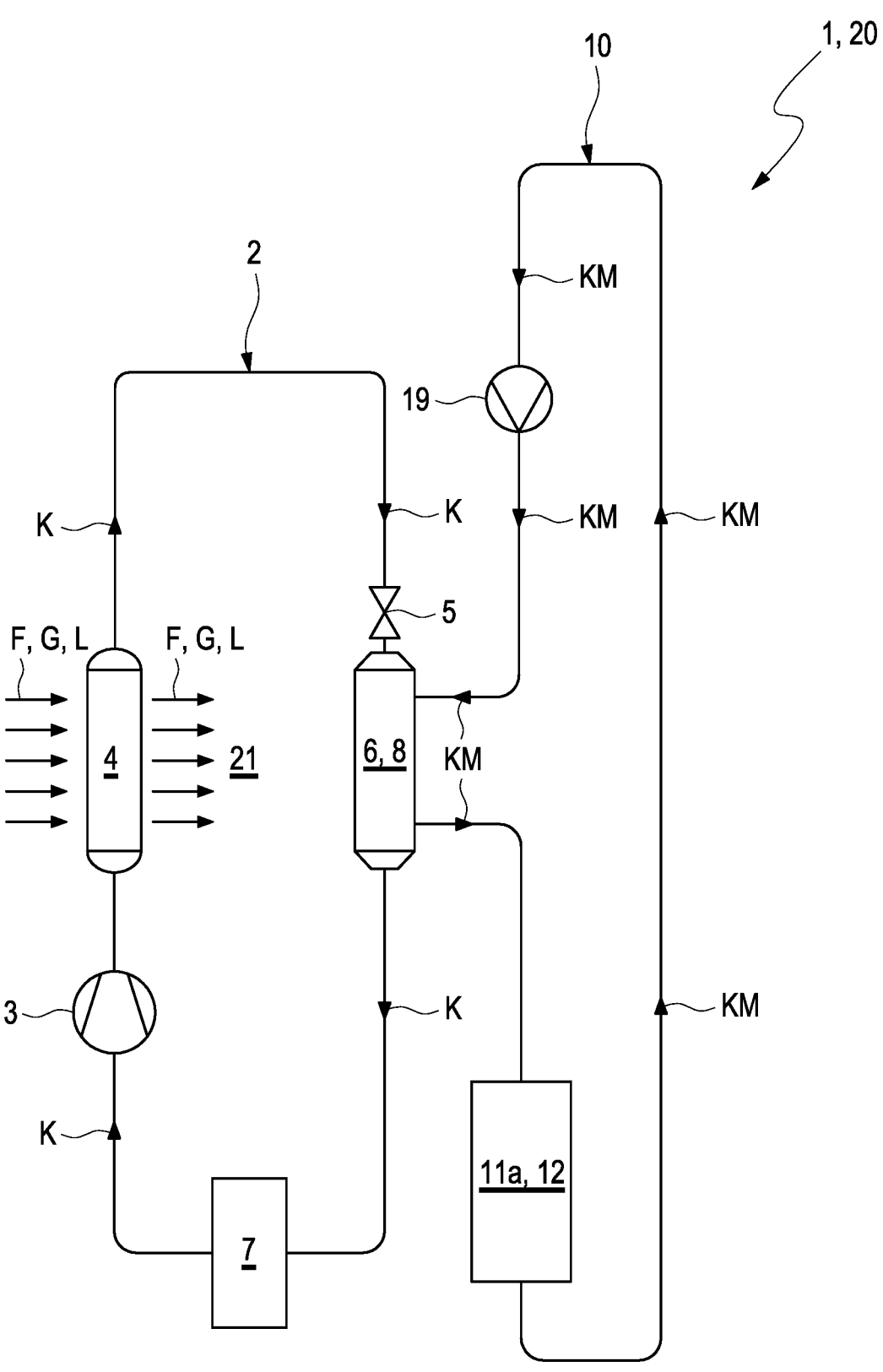
FIG. 1 an example of an air-conditioning system according to the invention in a circuit diagram-like representation, FIG. 2 a further development of the example of FIG. 1 having two instead of only one single heat source, FIG. 3 a variant of the example of the FIGS. 1 and 2, in which an air-conditioning system is integrated in a motor vehicle, so that the coolant circuit of the air-conditioning system is partially formed by a vehicle coolant circuit of the motor vehicle.

FIG. 1 illustrates in a circuit diagram-like representation an example of an air-conditioning system 1 according to the invention for a motor vehicle 20 which is not shown in more detail in the figures. The air-conditioning system 1 according to the invention includes a refrigerant circuit 2 for being flowed through by a refrigerant K. The refrigerant circuit 2 is designed closed so that the refrigerant K can circulate in the refrigerant circuit 2. In the refrigerant circuit 2, a compressor 3 for compressing the refrigerant K and downstream of the same a condenser 4 for condensing the refrigerant K subject to passing condensation heat on to a fluid F conducted through the condenser 4 are arranged. The said fluid F can be a gas G, for example air L, which in turn serves for heating a vehicle interior 21 of the motor vehicle 20 which is not shown in more detail in the figures. The condenser 4 can be designed as a two-stream heat exchanger which can be flowed through both by the refrigerant K and also, fluidically separated from the same, by the fluid F or gas G to be heated. Further, an expansion device 5 is arranged in the refrigerant circuit 2 downstream of the condenser 4 for expanding the refrigerant K and downstream of the same, an evaporator 6 for evaporating the refrigerant K. In addition, a collection reservoir 7 for buffer-storing the refrigerant K can be arranged in the refrigerant circuit 2.

Further, the air-conditioning system 1 includes a coolant circuit 10 formed separately from the refrigerant circuit 2 for being flowed through by a coolant KM. The coolant circuit 10 is also designed closed, so that the coolant KM can circulate in the coolant circuit 10. For driving the coolant KM, a delivery device 19, for example in the form of a coolant pump, is arranged in the coolant circuit 10. Furthermore, a heat source 11a for heating the coolant KM is arranged in the coolant circuit 10.

In the example of FIG. 1, the heat source 11a is an electric heating device 12 by means of which the coolant KM can be heated. The coolant circuit 10 is thermally connected to the refrigerant circuit 2 via the evaporator 6 of the same, so that in the evaporator 6 evaporation heat for evaporating the refrigerant K can be transferred from the coolant KM to the refrigerant K. For this purpose, the evaporator 6 is designed as heat exchanger 8 which can be flowed through both by the refrigerant K and also—fluidically separated from the refrigerant K, by the coolant KM. For this purpose, the evaporator 6 can comprise first fluid paths (not shown for the sake of clarity), which are part of the refrigerant circuit 2, and second fluid paths (not shown for the sake of clarity), which are part of the coolant circuit 10. These first and second fluid paths of the heat exchanger 8 are thermally coupled to one another so that heat can be transferred from the coolant KM to the refrigerant K.

Figure 2:
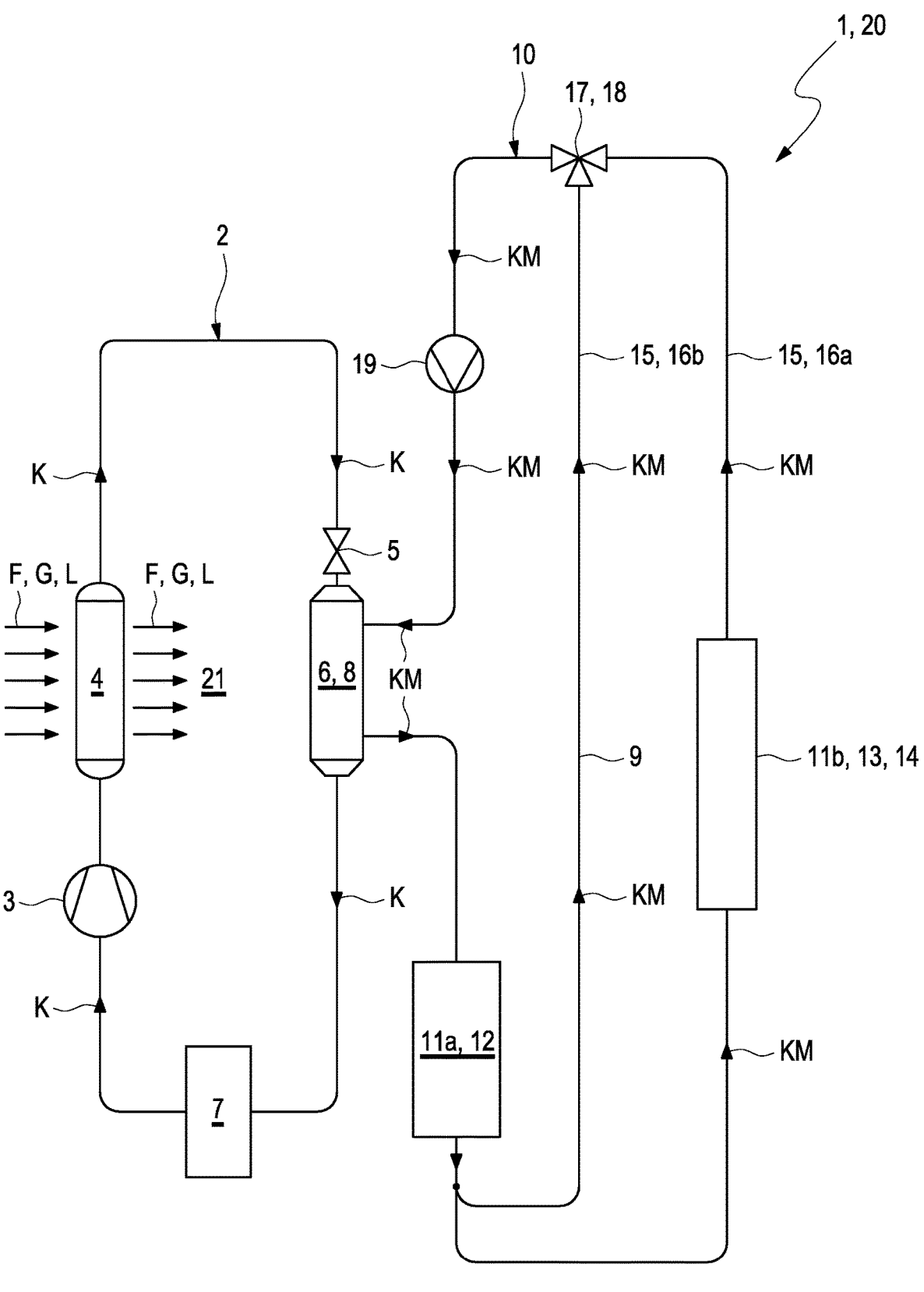

FIG. 2 shows a further development of the example of FIG. 1. In the example of FIG. 2, a first and a second heat source 11a, 11b fluidically connected in series are arranged in the coolant circuit 10. The first heat source 11a is formed by the electric heating device 12 already explained by way of FIG. 1 and the second heat source is formed by an electric energy store 13 in the form of an electric battery 14 which waste heat generated during the operation can be transferred to the coolant KM. In this way, even two different heat sources 11a, 11b can be utilised in order to make heat available to the refrigerant circuit 2. In the case that the air-conditioning system 1 is part of a motor vehicle 20 or electric vehicle, the electric energy store 13 or the battery 14 can be part of the motor vehicle 20 or of the electric vehicle.

In the example of FIG. 2, the coolant circuit 10 includes a bypass line 9, by means of which the coolant KM can be conducted past the second heat source 11b. In this way it can be achieved that the heat made available by the second heat source 11b is supplied to the coolant KM only when required.

In the example of FIG. 2, the said bypass is realised by means of a fluidic parallel connection 15 with two fluid branches 16a, 16b arranged in parallel. In the first fluid branch 16a, the second heat source 11b, i.e. the electric energy store 13 or the battery 14 is arranged. The second fluid branch 16b forms the bypass line 9 which is conducted past the second heat source 11b. The entire fluidic parallel connection 15 in turn is fluidically arranged in series with the first heat source 11a, so that the coolant KM cannot be conducted past the same.

In the example of FIG. 2, the coolant circuit 10 includes an adjustable valve device 17 in the form of a three-way valve 18. By means of the valve device 17, the portion of the coolant KM circulating in the coolant circuit 10 that is conducted through the first fluid branch 16a and thus through the second heat source 11b and the portion of the coolant KM circulating in the coolant circuit 10 that is conducted through the fluid branch 16b forming the bypass line 9 that is conducted past the second heat source 11b can be adjusted.

Figure 3:
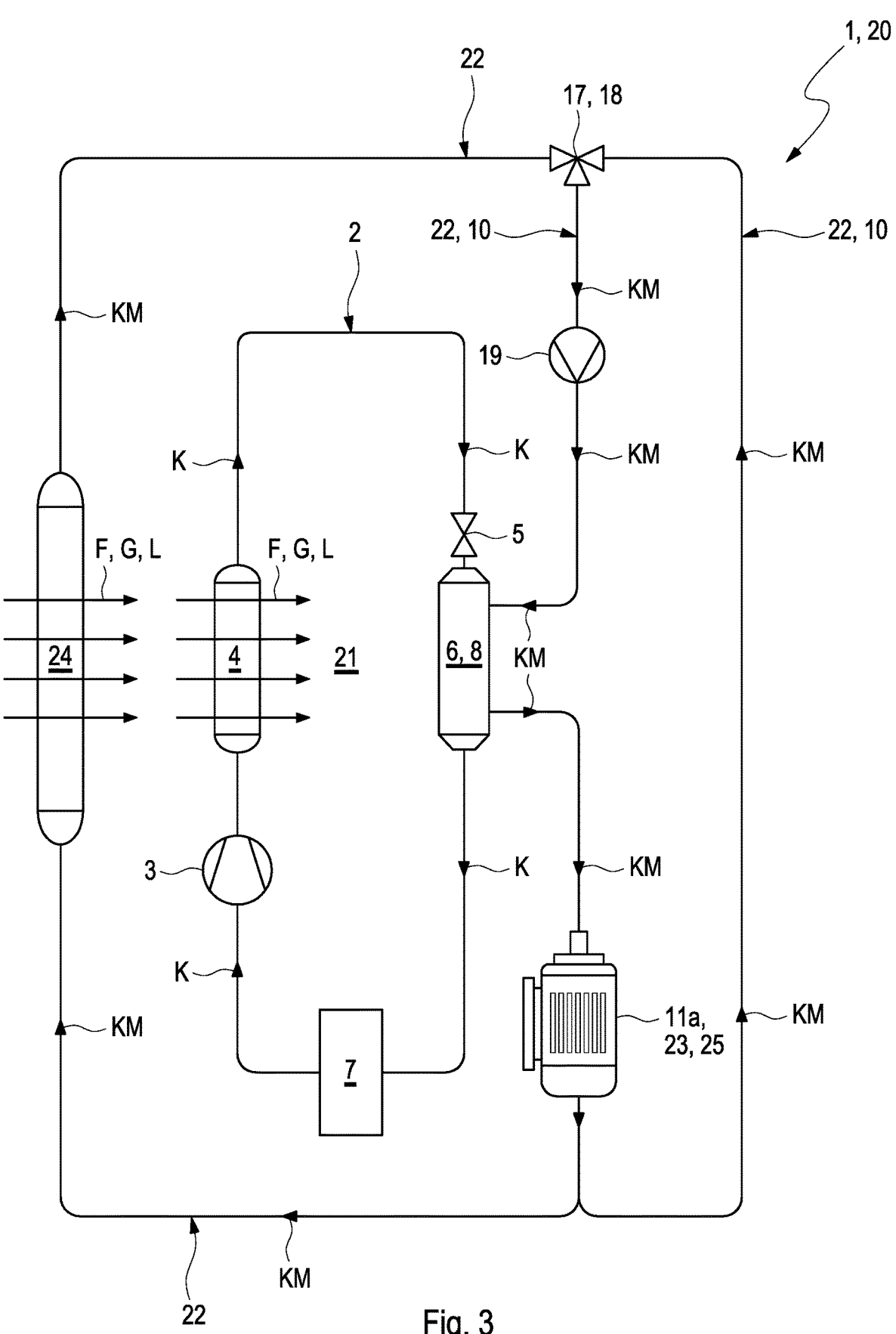

FIG. 3 shows a variant of the example of the FIGS. 1 and 2. In the example of FIG. 3, the heat source 11a is an electric drive train 23 of the motor vehicle 20 or electric vehicle, which can include an electric motor 25. The waste heat generated during the operation of the electric drive train 23 can thus be transferred to the coolant AM. Furthermore, the motor vehicle 20 includes a vehicle coolant circuit 22 for cooling the electric drive train 23. The coolant circuit 10 of the air-conditioning system 1 forms a part of the vehicle coolant circuit 22.

As is evident from FIG. 3, a coolant radiator 24 for transferring heat from the coolant KM to a fluid F or gas G conducted through the coolant radiator 24 is additionally arranged in the vehicle coolant circuit 22.

The invention claimed is:

1. An air-conditioning system for a motor vehicle, comprising:

a refrigerant circuit for being flowed through by a refrigerant, wherein in the refrigerant circuit a compressor for compressing the refrigerant, a condenser for condensing the refrigerant subject to passing condensation heat on to a fluid conducted through the condenser, an expansion device for expanding the refrigerant and an evaporator for evaporating the refrigerant are arranged, a coolant circuit provided fluidically separated from the refrigerant circuit for being flowed through by a coolant, a first heat source and a second heat source fluidically connected in series arranged in the coolant circuit for heating the coolant, wherein the coolant circuit includes a bypass where the coolant can be conducted past the second heat source, wherein the bypass comprises a fluidic parallel connection, and wherein the fluidic parallel connection is arranged in series with the first heat source, so that the coolant cannot be conducted past the first heat source, and wherein the coolant circuit is thermally connected to the refrigerant circuit via the evaporator of the refrigerant circuit, so that in the evaporator heat from the coolant is transferrable to the refrigerant.

2. The air-conditioning system according to claim 1, wherein the first heat source includes an electric heating device.

3. The air-conditioning system according to claim 2, wherein the second heat source includes an electric energy store where the waste heat of the electric energy store generated during operation is transferrable to the coolant.

4. The air-conditioning system according to claim 1, wherein the first heat source includes an electric drive train where the waste heat of the electric drive train generated during operation is transferrable to the coolant.

5. The air-conditioning system according to claim 1, wherein the fluidic parallel connection includes a first fluid branch and a second fluid branch arranged in parallel, wherein in the first fluid branch the second heat source is arranged, and the second fluid branch forms the bypass line.

6. The air-conditioning system according to claim 1, wherein the coolant circuit comprises an adjustable valve device structured and arranged to adjust a portion of coolant that is conducted through the bypass line past the second heat source.

7. The air-conditioning system according to claim 6, wherein the adjustable valve device is a three-way valve that includes: a first connection that communicates fluidically with the evaporator, a second connection that communicates fluidically with a first fluid branch of the fluidic parallel connection, and a third connection that communicates fluidically with a second fluid branch of the fluidic parallel connection.

8. The air-conditioning system according to claim 1, wherein the condenser is a two-stream heat exchanger that can be flowed through both by the refrigerant and also, fluidically separated from the refrigerant, by a fluid or gas to be heated.

9. The air-conditioning system according to claim 1, wherein in the refrigerant circuit a collection reservoir for buffer-storing refrigerant is arranged.

10. A motor vehicle, comprising:

a vehicle interior, an air-conditioning system for air-conditioning the vehicle interior, the air-conditioning system including:

a refrigerant circuit for being flowed through by a refrigerant, wherein in the refrigerant circuit a compressor for compressing the refrigerant, a condenser for condensing the refrigerant subject to passing condensation heat on to a fluid conducted through the condenser, an expansion device for expanding the refrigerant and an evaporator for evaporating the refrigerant are arranged, a coolant circuit provided fluidically separated from the refrigerant circuit for being flowed through by a coolant, a first heat source and a second heat source fluidically connected in series arranged in the coolant circuit for heating the coolant, wherein the coolant circuit includes a bypass where the coolant can be conducted past the second heat source, wherein the bypass comprises a fluidic parallel connection, and wherein the fluidic parallel connection is arranged in series with the first heat source, so that the coolant cannot be conducted past the first heat source, and wherein the coolant circuit is thermally connected to the refrigerant circuit via the evaporator of the refrigerant circuit, so that in the evaporator heat from the coolant is transferrable to the refrigerant.

11. The motor vehicle according to claim 10, further comprising an electric drive train and a vehicle coolant circuit for cooling the electric drive train, wherein in the vehicle coolant circuit a coolant radiator for transferring heat from the coolant to a gas conducted through the coolant radiator is arranged.

12. The motor vehicle according to claim 11, wherein the first heat source includes the electric drive train where waste heat of the electric drive train generated during operation is transferrable to the coolant.

13. The motor vehicle according to claim 10, wherein the first heat source includes an electric heating device.

14. The motor vehicle according to claim 13, wherein the second heat source includes an electric battery where the waste heat of the electric battery generated during operation is transferrable to the coolant.

15. The motor vehicle according to claim 10, wherein the fluidic parallel connection includes a first fluid branch and a second fluid branch arranged in parallel, wherein in the first fluid branch the second heat source is arranged, and the second fluid branch forms the bypass line.

16. The motor vehicle according to claim 15, wherein the coolant circuit comprises an adjustable valve device structured and arranged to adjust a portion of coolant that is conducted through the bypass line past the second heat source.

17. The motor vehicle according to claim 16, wherein the adjustable valve device is a three-way valve that includes: a first connection that communicates fluidically with the evaporator, a second connection that communicates fluidically with the first fluid branch, and a third connection that communicates fluidically with the second fluid branch.

18. The motor vehicle according to claim 16, wherein the coolant circuit comprises a delivery device arranged between the adjustable valve device and the evaporator.

19. The motor vehicle according to claim 10, wherein the condenser is a two-stream heat exchanger that can be flowed through by the refrigerant and a fluid or gas to be heated fluidically separated from the refrigerant.

20. The motor vehicle according to claim 10, wherein in the refrigerant circuit a collection reservoir for buffer-storing the refrigerant is arranged.

* * * * *